United States Patent
Le Faucheur et al.

(10) Patent No.: US 7,852,748 B2
(45) Date of Patent: Dec. 14, 2010

(54) METHOD AND SYSTEM FOR PROVIDING VOICE QOS DURING NETWORK FAILURE

(75) Inventors: Francois Le Faucheur, Valbonne (FR); John Evans, London (GB); Alton Lo, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 991 days.

(21) Appl. No.: 11/088,389

(22) Filed: Mar. 23, 2005

(65) Prior Publication Data

US 2006/0215548 A1 Sep. 28, 2006

(51) Int. Cl.
*G01R 31/08* (2006.01)
(52) U.S. Cl. .................................. 370/217; 370/235
(58) Field of Classification Search .............. 370/217, 370/218, 221, 225, 226, 227, 228, 231, 235, 370/252, 389
See application file for complete search history.

(56) References Cited

U.S. PATENT DOCUMENTS

| | | | |
|---|---|---|---|
| 5,253,248 A | * | 10/1993 | Dravida et al. ............. 370/228 |
| 6,865,149 B1 | * | 3/2005 | Kalman et al. ............. 370/225 |
| 7,009,934 B1 | * | 3/2006 | Perkins et al. ............. 370/228 |
| 7,039,005 B2 | * | 5/2006 | Jenq et al. ................. 370/217 |
| 7,289,431 B2 | | 10/2007 | Iijima et al. |
| 2002/0004843 A1 | * | 1/2002 | Andersson et al. .......... 709/238 |
| 2002/0172148 A1 | | 11/2002 | Kim et al. |
| 2003/0063560 A1 | | 4/2003 | Jenq et al. |

OTHER PUBLICATIONS

F. Le Faucheur et al., "Multi-Protocol Label Switching (MPLS) Support of Differentiated Services" RFC 3270, May 2002.
M. Pierce et al., Multi-Level Expedited Forwarding Per Hop Behavior (MLEF PHB), IETF Internet Draft, Feb. 12, 2005.

\* cited by examiner

*Primary Examiner*—Firmin Backer
*Assistant Examiner*—Christine Ng
(74) *Attorney, Agent, or Firm*—Cindy Kaplan (57) ABSTRACT

A method and system for providing QoS in a network after a network failure are disclosed. The network includes at least one primary tunnel and at least one backup tunnel protecting a segment of the primary tunnel. The method includes receiving notification of a failure within the primary tunnel segment and rerouting received packets onto the backup tunnel. The rerouted packets are marked to identify packets affected by the failure and are subject to a different QoS policy than packets that have not been rerouted due to the failure.

25 Claims, 4 Drawing Sheets

METHOD AND SYSTEM FOR PROVIDING VOICE QOS DURING NETWORK FAILURE

BACKGROUND OF THE INVENTION

The present invention relates generally to data networking, and more particularly, to ensuring QoS (Quality of Service) of voice or mission critical traffic during network failure.

The Internet and IP networks in general have become enablers for a broad range of business, government, and personal activities. More and more, the Internet is being relied upon as a general information source, business communication tool, entertainment source, and as a substitute for traditional telephone networks and broadcast media. As the Internet expands its role, users become more dependent on uninterrupted access.

To assure rapid recovery in the event of failure of a network link or node, Fast Reroute (FRR) techniques have been developed. In a network employing Fast Reroute, traffic flowing through a failed link or node is rerouted through one or more preconfigured backup tunnels. The preconfigured backup tunnels facilitate a key goal of Fast Reroute techniques, the redirection of interrupted traffic within tens of milliseconds. This minimizes impact on the user experience. The Fast Reroute techniques have been developed in the context of MPLS (Multiprotocol Label Switching) where traffic flows through label switched paths (LSPs). When an element such as a link or node fails, all of the LSPs using that failed element are redirected through preconfigured backup tunnels that route around the impacted segments of the LSPs.

Providing strict QoS to voice during network failure still remains an open problem in large scale voice deployment where the proportion of voice traffic is high. Multiservice networks, such as those carrying telephony traffic, require very tight QoS as well as very fast recovery in case of network failure. A number of techniques, including Diffserv (Differentiated Services), MPLS Traffic Engineering, capacity planning, and RSVP (ReSerVation Protocol) based CAC (call admission control) are available to provide very tight QoS in the absence of failure. However, none of these voice load control approaches perform very well during a network failure. For example, when only capacity planning is used to ensure voice QoS, enough spare capacity needs to be provisioned to ensure that there is no congestion in failure cases. While many networks provision to allow for single element failures, there still may be congestion if multiple failures occur concurrently (or in the case of unexpected traffic load or traffic distribution) unless gross overprovisioning is used.

With RSVP based CAC approaches, in the time interval immediately following network failures, IGP may reroute traffic affected by the failure, before a new admission control decision has been taken. Thus, congestion may occur in this transient period before CAC is performed and some calls are potentially torn down.

A number of techniques, such as MPLS/IP Fast Reroute discussed above, are available to provide very fast recovery in case of failure. However, there are only limited techniques available for protecting QoS over the period during which fast recovery mechanisms are in use. For example, with MPLS Fast Reroute, unless Bandwidth Protection mechanisms are used there may be congestion, which will last until an alternate path is found. If no alternate path is found, the congestion will last indefinitely.

Bandwidth Protection builds on the use of MPLS Fast Reroute by allocating bandwidth to backup tunnels. Bandwidth Protection thus requires a very significant amount of bandwidth to be dedicated to backup to protect all voice traffic in all targeted failure scenarios. Bandwidth Protection attempts to minimize the amount of capacity allocated to FRR backup tunnels by including smart optimizations, such as sharing backup capacity for protection of different failures which are unlikely to happen at the same time. However, this approach still requires that there is enough capacity to support all traffic after the failure, otherwise all traffic flow can get degraded. Bandwidth Protection also cannot cope with unplanned combinations of failures.

A network operator is therefore left with two options to deal with network failures. The first is to allocate a large amount of capacity to make sure QoS of all the targeted traffic can be maintained during any failure scenario. The second is to accept that any flow from the targeted traffic may be degraded during a failure. Both of these options have drawbacks. For example, the first option is very expensive, and the second results in a possible degradation in QoS for all the traffic flow.

There is, therefore, a need for a method and system for mitigating QoS degradation during network failure in different environments.

SUMMARY OF THE INVENTION

Embodiments of the present invention provide a method and system for protecting QoS in a network after a network failure occurs. In one embodiment, the network includes at least one primary tunnel and at least one backup tunnel protecting a segment of the primary tunnel. A method includes receiving notification of a failure within the primary tunnel segment and rerouting received packets onto the backup tunnel. The rerouted packets are marked to identify packets affected by the failure so that a separate policy is applied to the rerouted packets. This policy is such that if there is no congestion after the failure, then all the rerouted packets are transmitted the same as non-rerouted packets. However, if congestion occurs following the failure, then some of the rerouted packets are dropped in order to ensure that non-rerouted packets are not dropped and can retain their QoS.

In another aspect of the invention, a method generally comprises creating a primary tunnel, establishing a backup tunnel protecting a segment of the primary tunnel, activating the backup tunnel in response to failure of the primary tunnel segment, and forwarding packets assigned to the primary tunnel via the backup tunnel. The method further comprises identifying packets affected by the failure as demoted packets and applying a separate policy to the demoted packets. If no congestion is present, the rerouted packets are transmitted in the same manner as the non-rerouted packets. If congestion occurs at least a portion of the demoted packets are dropped, while protecting the packets not affected by the failure.

In yet another aspect of the invention, a system for identifying packets rerouted following a failure in a network generally comprises a network element located in a path of a primary tunnel in the network and a backup tunnel protecting a segment of the primary tunnel. The network element is operable to receive notification of a failure within the primary tunnel and route packets received from the primary tunnel to the backup tunnel. The network element comprises a demotion apparatus configured to mark the rerouted packets to identify packets affected by the failure as demoted packets such that a differentiated QoS policy can be applied to the demoted packets.

Further understanding of the nature and advantages of the inventions herein may be realized by reference to the remaining portions of the specification and the attached drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system of the present invention (referred to herein as Fast Reroute (FRR) Demotion) protect QoS to voice (or other targeted traffic) during network failures by mitigating QoS degradation during network failures. Dynamic routing mechanisms such as Fast Reroute, attempt to route all traffic after a network failure to a new path. In the case of topology change (and in particular in the case of a link or node failure), all traffic affected by the topology change gets rerouted to its new path. The method and system of the present invention keep track of a subset of traffic that was affected by the network failure, after the rerouting takes place, and use this information to enforce differentiated QoS policies. If there is no congestion after a network failure, there is no degradation of traffic. However, if there is congestion after the failure, only the subset of traffic, which is affected by the failure, is degraded while the rest of the traffic is protected.

In one embodiment, the Fast Reroute Demotion extends the FRR policy such that fast rerouted traffic can be demoted so that it can subsequently be identified as rerouted traffic and preferentially discarded. QoS mechanisms are used to reflect the identification and enforce a QoS policy so that the non-rerouted traffic gets priority over the rerouted traffic. The QoS mechanism is tied together with Fast Reroute state information and forwarding state information maintained by a Fast Reroute mechanism is used to selectively mark traffic which is currently fast rerouted. The selective marking is then used to apply differentiated treatment to the that traffic, as described below.

Figure 1:
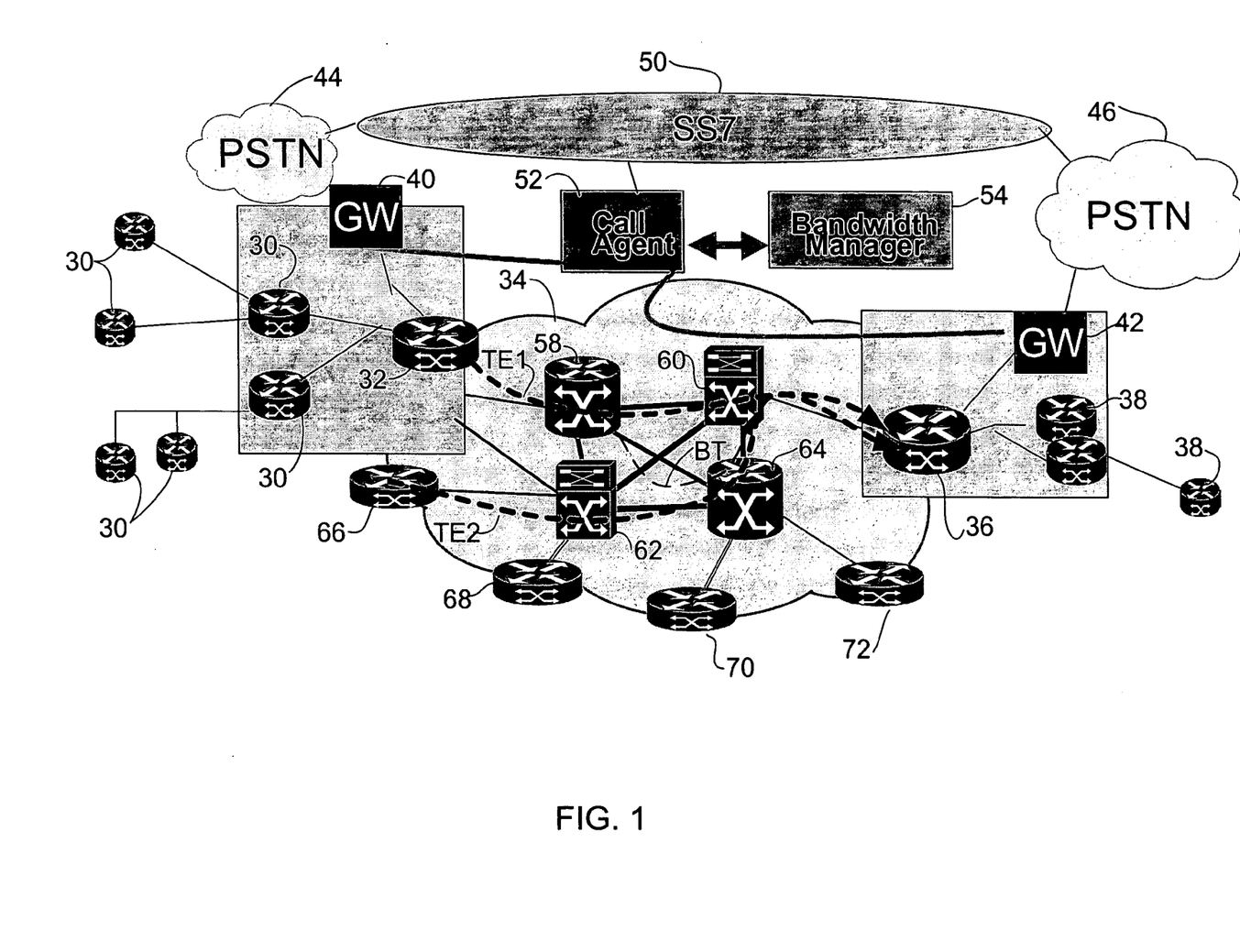
FIG. 1 depicts an example of a network architecture to which embodiments of the present invention may be applied.

Referring now to the drawings, and first to FIG. 1, one example of a network that may implement Fast Reroute Demotion is shown. The present invention operates in the context of a data communication network including multiple network elements. Some of the elements in a network that employs the present invention may be network devices such as routers or switches. For example, some of the nodes may be specially configured routers such as those available from Cisco Systems, Inc. of San Jose, Calif. The router may include, for example, a master central processing unit (CPU), interfaces, and a bus. The CPU preferably includes memory and a processor. A router may be implemented on a general purpose network host machine such as a computer system or network device described below with respect to FIG. 2.

Figure 2:
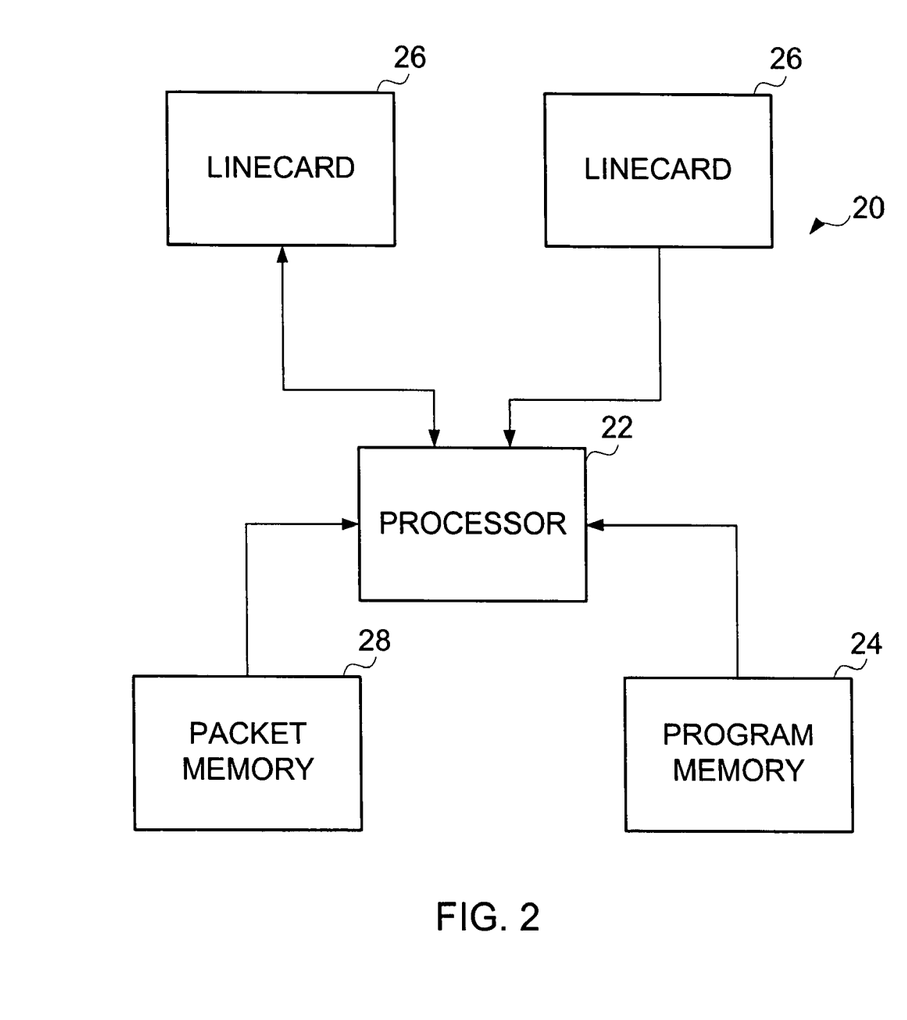
FIG. 2 depicts a network device useful in implementing embodiments of the present invention.

FIG. 2 depicts a network device 20 that may be used to implement any of the network elements of FIG. 1. In one embodiment, network device 20 is a programmable machine that may be implemented in hardware, software, or any combination thereof. A processor 22 executes codes stored in a program memory 24. Program memory 24 is one example of a computer-readable medium. Program memory 24 can be a volatile memory. Another form of computer-readable medium storing the same codes would be some type of non-volatile storage such as floppy disks, CD-ROMs, DVD-ROMs, hard disks, flash memory, etc.

Network device 20 interfaces with physical media via a plurality of linecards 26. Any number of linecards 26 may be used and each linecard may include numerous separate physical interfaces. Linecards 26 may incorporate DSL interfaces, Ethernet interfaces, Gigabit Ethernet interfaces, 10-Gigabit Ethernet interfaces, Frame relay interfaces, ATM interfaces, SONET interfaces, dial-up interfaces, wireless interfaces, etc. The various components are interconnected by a backplane. As packets are received, processed, and forwarded by network device 20, they may be stored in a packet memory 28.

The present invention is described herein with reference to a representative application but is not limited to this application. In the representative application, calls such as voice or video calls are carried across a packet network such as an IP network. The network devices operate in accordance with various protocols including, for example, TCP/IP, MPLS, MPLS Traffic Engineering, and MPLS Fast Reroute. In one implementation, when a packet is received by a linecard 26, the linecard determines the output linecard and interface and forwards the packet. Prior to transfer of the packet, the receiving linecard 26 encapsulates the packet with any needed layer 2 addressing information for forwarding to the next hop node and the label or labels required by operation of the MPLS and/or MPLS Fast Reroute protocols. The routing processor sets up label switched paths (LSPs) and backup tunnels by appropriately modifying forwarding information on the linecards. The primary LSPs may support, for example, Traffic Engineering (TE) tunnels, layer 2 or layer 3 virtual private networks, pseudowire emulated circuits, virtual private LAN service, etc.

Referring again to FIG. 1, packets are originated or terminated by various user agents which are devices such as telephones, video phones, computers, etc. (not shown) coupled to routers 30. Data traffic flows through various routers 30 and edge router 32 into a network cloud 34 that includes further routers 58, 60, 62, 64, 66, 68, 70, 72. On the other side of the cloud there is another edge router 36 and other routers 38 and user agents (not shown). In the example shown in FIG. 1, the access routers 32, 36 are in communication with gateways 40, 42, which in turn communicate with public switched telephone networks (PSTNs) 44, 46, respectively. SS7 (Signaling System Number 7) 50 sources out-of-band signaling throughout the PSTNs 44, 46. The network also includes a call agent 52 and bandwidth manager 54.

Voice traffic is carried over MPLS TE tunnels. The bandwidth manager 54 provides CAC of voice calls over primary tunnels. In the example shown, a primary TE tunnel (TE1) extends from edge router 32 through network elements 58 and 60 to edge router 36. Another tunnel (TE2) passes from edge device 66 through network elements 62, 64, and 60 to edge device 36. Network device 32 notifies the bandwidth manager 54 of the tunnel status and the bandwidth manger applies CAC of calls over the TE tunnels.

Prior to failure, the voice load on the network is controlled to ensure strict QoS voice traffic using conventional voice load control techniques (e.g., capacity planning, Bandwidth Manager CAC, RSVP-based CAC, or other suitable techniques). In one embodiment, the network may use CAC and CSPF (Constraint Shortest Path Fast) of TE tunnel over core network to provide strict QoS in the absence of network failure.

Following a failure, dynamic rerouting takes place to restore the connectivity. The rerouting may be performed using any number of techniques, including, for example, regular IGP rerouting, Fast IGP rerouting, MPLS Fast Reroute, or any other suitable technique. With MPLS TE FRR, backup tunnels are pre-calculated and configured to provide a path around a protected element (link or node). Traffic flowing through a failed link or node is rerouted through one or more preconfigured backup tunnels. When an element such as a link or node fails, all of the LSPs using that failed element are redirected through preconfigured backup tunnels that route around the impacted segments. When the failure is detected, any primary TE tunnels which were traversing the failed element are rapidly switched locally by the router interfacing the failed link or node onto the pre-calculated backup tunnels. The head-end of the primary tunnel is also notified of the link failure through IGP or through RSVP. The head-end then attempts to re-establish the tunnel along a potentially more optimal route that bypasses the failure.

In the example shown in FIG. 1, if a failure occurs along the tunnel TE1 at a link between devices 58 and 60, an FRR backup tunnel (BT) is provided which extends between devices 58 and 60. Regardless of the approach used for Voice Load Control (e.g., Bandwidth Manager, RSVP-based CAC, etc.) there is a period of time needed by the Voice Load Control mechanisms to adjust to the new routing state. During this transient period, some voice traffic is rerouted on the remaining links. This may result in congestion in the voice queue and degrade the QoS of all voice calls on the link. As described below, an FRR demotion mechanism is used to mark voice packets which go in the backup tunnel and a differential dropping mechanism is activated. For example, in the network shown in FIG. 1, packets switched from primary tunnel TE1 to backup tunnel BT following a failure in TE1 are marked to identify the packets as demoted packets and distinguish the packets from those not affected by the failure (e.g., packets on TE2).

Both the regular voice traffic (traffic on primary tunnel TE2) and the rerouted voice traffic (traffic on backup tunnel BT) are scheduled, for example, in an EF (Expedited Forwarding) queue. If the network has enough capacity for all of the traffic, no voice QoS degradation occurs. If there is no congestion, the system protects traffic (e.g., does not drop traffic). The rerouted packets are handled like the packets not affected by the failure and transmitted in the same manner. However, if not enough capacity is available, voice QoS degradation is localized to the subset of demoted voice packets. If there is congestion, then the necessary amount of demoted traffic is dropped to protect the QoS of the non-rerouted voice traffic. The system protects the calls which were not transiting via the failed element by dropping only rerouted traffic. These calls will either not have been admitted on the rerouted path or will already have experienced some loss as a result of being rerouted. The system thus minimizes the number of calls affected by dropping some or all of the packets from a smaller subset of calls, rather than dropping randomly across all calls.

It is to be understood that the network shown in FIG. 1 and described above is only one example, and other network configurations and voice load control architectures may be used without departing from the scope of the invention. For example, RSVP may be used to provide application level CAC feedback, rather than a bandwidth manager. In another embodiment, RSVP may be used with partial bandwidth protection. Also, the network may be configured such that an operator can control whether bandwidth protection is provided during Fast Reroute.

Figure 3:
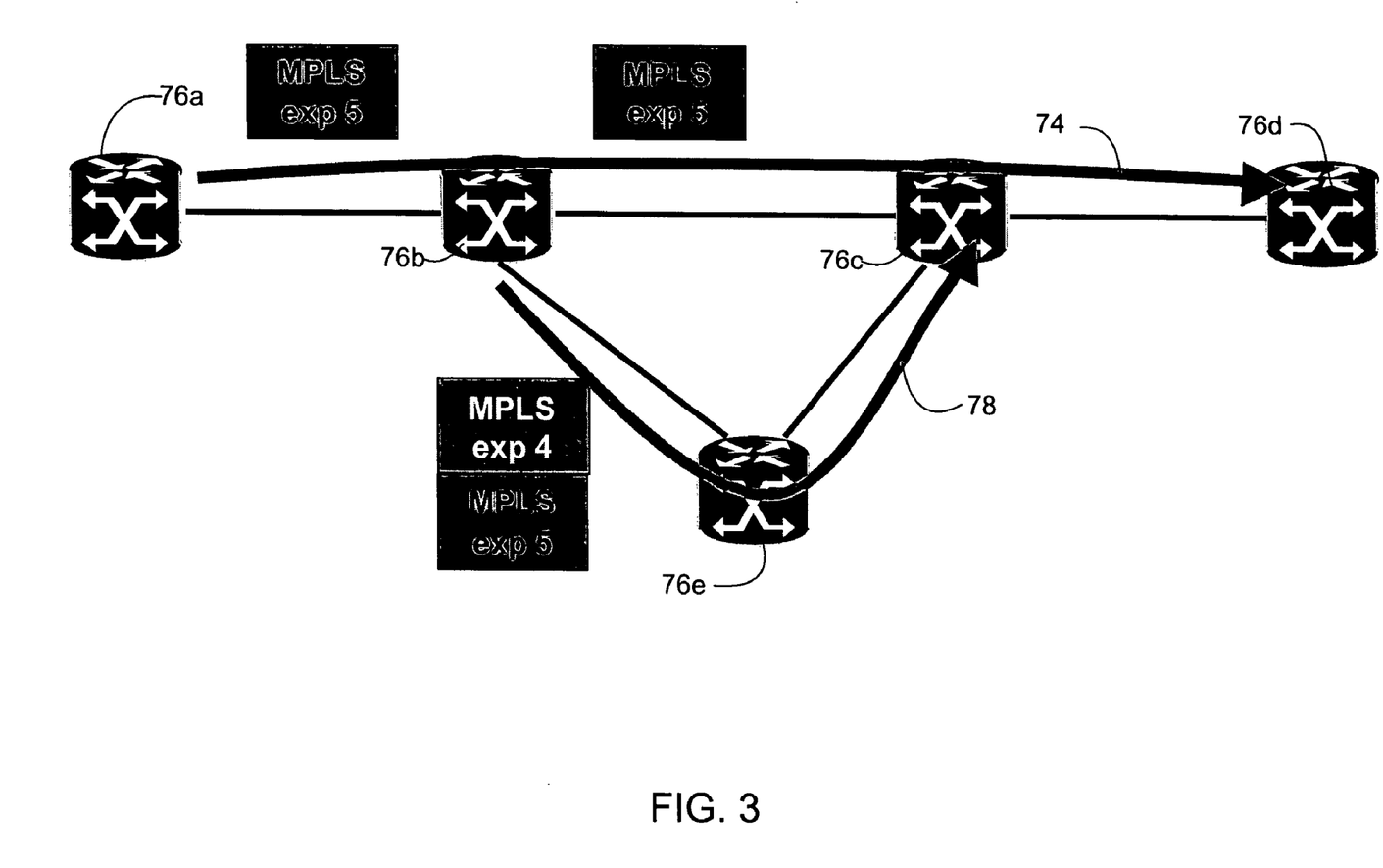
FIG. 3 is a diagram illustrating one embodiment of a Fast Reroute demotion mechanism of the present invention for marking rerouted traffic.

FIG. 3 illustrates one example for marking demoted traffic. The experimental field (EXP) in an MPLS label in the backup tunnel stack entry is remarked to a configurable value. Primary TE tunnel 74 extends between router 76a and 76d, passing through routers 76b and 76c. A backup tunnel 78 extends between routers 76b and 76c and passes through router 76e. The backup tunnel can be identified as such by the control plane through explicit notification in tunnel establishment signaling or may have been signaled as an L-LSP, as described in IETF RFC 3270, "Multi-Protocol Label Switched (MPLS) Support of Differentiated Services", Le Faucheur et al., May 2002, which is incorporated herein by reference in its entirety. As shown in FIG. 3, the EXP field is marked for the traffic passing through the backup tunnel. The backup tunnel is configured on router 76b to enable TE demotion and mark the reroute traffic MPLS EXP to 4. The non-rerouted traffic retains its MPLS EXP marking of 5.

Methods for identifying the demoted traffic include an EXP-based pushed only approach (where only the EXP of the pushed label stack entry is demoted) or an EXP-based pushed and swapped approach (where both the EXP of the pushed label stack entry and the swapped label stack entry are demoted). With the former approach, if Penultimate Hop Popping (PHP) is used, the penultimate router of the backup tunnel does classification based on EXP before label POP. Flexible demotion mapping may also be used.

As discussed above, the Fast Reroute mechanism is used to identify the traffic that is demoted. Some granularity may be available as to which rerouted traffic should be demoted during Fast Reroute. For example, demotion may be applied only to Voice tunnels, which can be identified via their bandwidth pools (DS-TE Class-Type signaled in RSVP-TE).

The MPLS FRR demotion capability may also be applied at primary tunnel head-ends so that if there is a failure of the primary tunnel, due to a CAC failure, for example, tunnel traffic which is rerouted onto the IGP shortest path is similarly demoted such that it can be subsequently identified as rerouted traffic and hence preferentially discarded.

Figure 4:
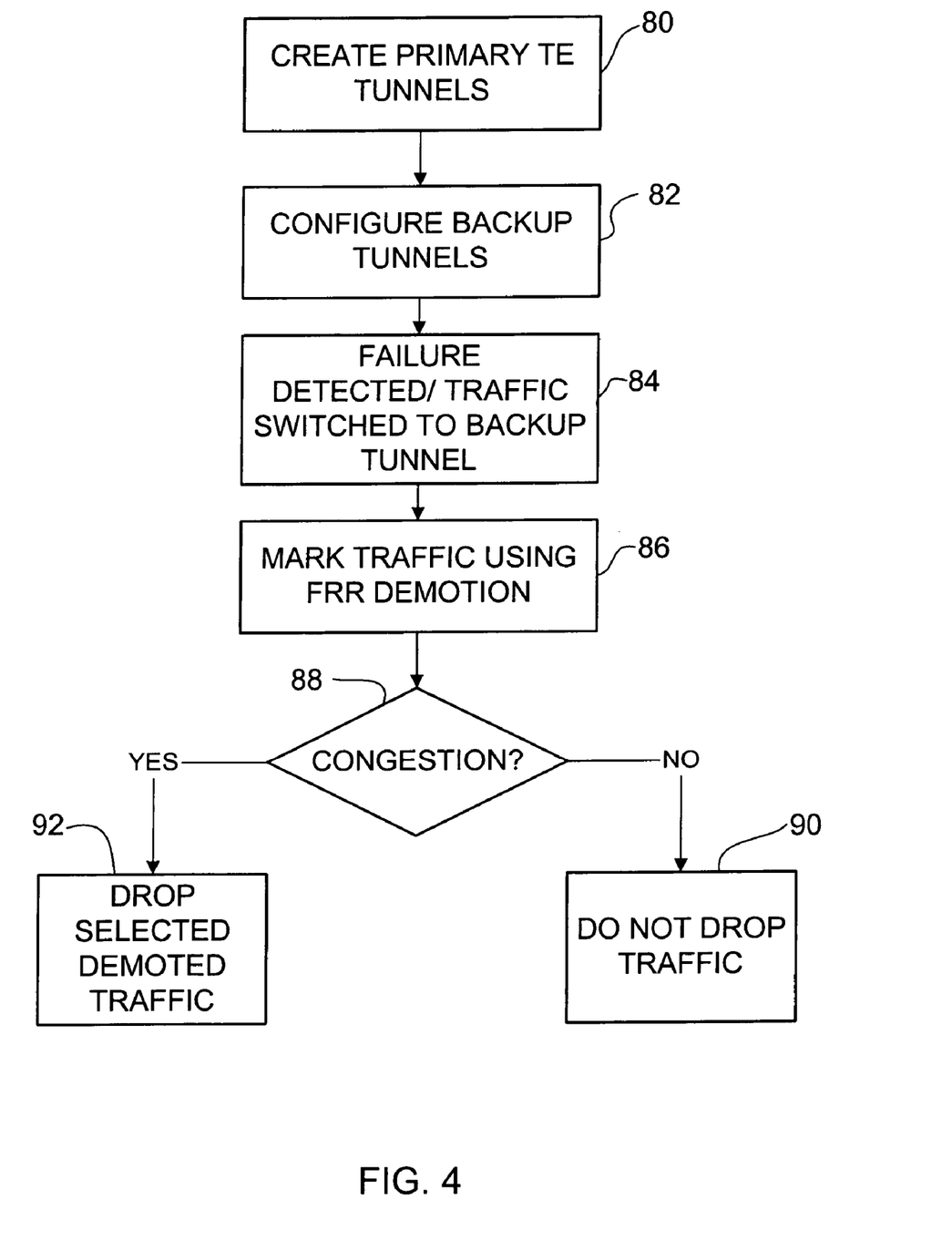
FIG. 4 is a flowchart illustrating a Fast Reroute demotion process of the present invention.

FIG. 4 is a flowchart illustrating one example of a method of the present invention for identifying traffic affected by a topology change after traffic is rerouted to a backup tunnel following a network failure. At step 80 primary TE tunnels are established in a core network. TE FRR backup tunnels are pre-calculated and configured to provide a path around protected elements (step 82). Voice traffic is carried over the MPLS TE tunnels and voice load control is applied to provide strict QoS in the absence of failure. At step 84, a failure is detected and traffic on the affected TE tunnel is switched to the backup tunnel. The traffic that is rerouted to the backup tunnel is marked using the FRR demotion mechanism (step 86). If there is no congestion after the failure, no traffic is degraded (steps 88 and 90). If congestion is present, a necessary amount of demoted traffic is dropped to protect the QoS of the regular voice traffic (steps 88 and 92).

As discussed above, if voice congestion is present, a necessary amount of demoted traffic is dropped to protect the QoS of voice traffic not affected by the failure. Voice traffic which has been rerouted and is temporarily not protected by CAC of its primary tunnel is identified. Queue-less or queue-based approaches may be used to ensure that the necessary amount of demoted traffic is dropped if congestion occurs.

Queueless rate control techniques may include, for example, HMMP (Hierarchical Multi-rate Multi-precedence Policer), as described in U.S. patent application Ser. No. 11/019,915 (Francois Le Faucheur et al., filed Dec. 21, 2004), or Coupled Policers, described in U.S. patent application Ser. No. 10/607,711 (Prashant Gandhi et al., filed Jun. 27, 2003), which are both incorporated by reference herein in their entirety.

For example, HMMP may be used to police separately the demoted voice and the regular (nondemoted) voice traffic. The policing rate for the demoted voice traffic is the difference between a configured maximum acceptable rate for the EF queue and the rate currently consumed by regular voice traffic. Token buckets may be used for demoted voice (Td) and regular voice (Tr). In one embodiment, Tr and Td are both filled at the same rate (R). Td is checked before transmitting a demoted voice packet. If there are not enough available tokens, the packet is dropped. If there are available tokens, Td is decremented and the packet is transmitted. Tr is checked before transmitting a regular voice packet. If there are not enough tokens, the packet is dropped. If enough tokens are available, Tr is decremented and the packet is transmitted. Whenever Tr is decremented, Td is also decremented by the same amount.

In another example, Coupled Policers may be used to control how bandwidth left unused by regular voice traffic is redistributed to demoted traffic. As described above with regard to HMMP, a token bucket Td is used for demoted voice packets and Tr for regular voice packets. For demoted voice packets, if Td does not have enough tokens, the demoted voice packet is dropped. If Td has available tokens, Td is decremented and the packet is transmitted. For regular voice packets, if Tr does not have enough tokens, the packet is dropped. If Tr has available tokens, Tr is decremented and the packet is transmitted. In this example, Tr is filled at rate R and Td is only filled up by tokens overflowing from Tr. Whenever Tr gets filled up (i.e., reaches its maximum burst), any excess token goes into Td.

Queue-based approaches include, for example, Multi-Level Expedited Forwarding (MLFF), described in "Multi-Level Expedited Forwarding Per Hop Behavior (MLEF PHB)", draft-silverman-tsvwg-mlefphb-02.txt, Feb. 12, 2005, which is incorporated herein by reference in its entirety. MLEF may be used, for example, to apply different drop thresholds within the EF queue to detect a congestion situation and drop the demoted traffic. Another queue-based approach includes separate or hierarchical scheduling of the demoted voice traffic and regular voice traffic.

It is to be understood that the methods described above for use in handling the demoted traffic in the case of congestion are only examples, and that other methods may be used without departing from the scope of the invention. For example, the FRR demotion may be used in combination with various QoS mechanisms (e.g., RED, WRED, tail-drop, separate parallel or hierarchical queue) to enforce the QoS differentiation in case of congestion.

As can be observed from the foregoing, the FRR demotion system and method described herein have many advantages. For example, FRR demotion allows operators to avoid the cost of provisioning back up capacity to protect peak load during any possible failure while at the same time avoiding QoS degradation impact on all key traffic (e.g., voice). This is important where a proportion of key traffic is high. The operator is able to provision as much capacity for backup as is appropriate and take advantage of that capacity to its full extent without any QoS loss on any traffic, if the actual load fits after reroute. Also, the majority of key traffic can be protected from QoS degradation if the actual load does not fit after reroute. The QoS degradation can be localized to the subset of traffic which is affected by failure if the actual load does not fit after reroute.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing Quality of Service (QoS) in a network after a network failure, the network comprising at least one primary tunnel and at least one backup tunnel protecting a segment of said primary tunnel, the method comprising:
   transmitting voice traffic received at a network device over said primary tunnel, wherein voice load control is applied to said voice traffic;
   receiving notification of a failure of a link or a node within said primary tunnel segment at the network device, wherein said failed link or node is no longer operable to transmit traffic in said primary tunnel segment and said failure results in a loss of connectivity over said primary tunnel segment;
   rerouting at the network device, all received packets assigned to said primary tunnel onto the backup tunnel; and
   marking at the network device, said rerouted packets to identify packets affected by the failure, for a time interval following the failure and before said voice load control adjusts for the failure;
   wherein said rerouted packets are subject to a different QoS policy than packets that have not been rerouted due to the failure.

2. The method of claim 1 wherein said QoS policy applied to said rerouted packets is configured such that:
   if there is no congestion following the failure, said rerouted packets are transmitted in the same manner as the packets that have not been rerouted; and
   if congestion occurs said rerouted packets have a lower priority than the packets that have not been rerouted.

3. The method of claim 1 wherein said primary and backup tunnels are MPLS tunnels.

4. The method of claim 1 wherein there is no QoS degradation for the non-rerouted packets whether or not congestion occurs.

5. The method of claim 1 wherein said QoS policy applied to the rerouted packets comprises dropping at least a portion of the rerouted packets if congestion occurs.

6. The method of claim 1 wherein a policing rate for the rerouted packets is the difference between a configured maximum acceptable rate for a queue and a rate consumed by traffic not affected by the failure.

7. The method of claim 1 wherein marking said rerouted packets comprises marking an EXP field in one or more MPLS label stack entries of the packets.

8. The method of claim 1 wherein said QoS policy applied to said rerouted packets is configured such that:
   if there is no congestion following the failure, said rerouted packets are transmitted in the same manner as the packets that have not been rerouted; and if congestion occurs only a necessary amount of said rerouted packets are dropped to protect the QoS of voice traffic that has not been rerouted.

9. A method for providing Quality of Service (QoS) in a network after a network failure, the method comprising:
creating a primary tunnel;
establishing a backup tunnel protecting a segment of said primary tunnel;
forwarding all packets assigned to said primary tunnel via said backup tunnel in response to failure of a link or a node in said primary tunnel segment, wherein said failed link or node is no longer operable to transmit traffic in said primary tunnel segment and said failure results in a loss of connectivity over said primary tunnel segment;
identifying packets affected by the failure as demoted packets; and
applying to said demoted packets at a network element, a different QoS policy than applied to packets that have not been rerouted due to the failure, wherein applying said different QoS policy comprises applying said different QoS policy until a voice load control adjusts to said failure.

10. The method of claim 9 wherein said QoS policy applied to said demoted packets is configured such that:
if there is no congestion following the failure, said demoted packets are transmitted in the same manner as the packets that have not been rerouted; and
if congestion occurs at least some of said rerouted packets are dropped, while the packets that have not been rerouted are protected.

11. The method of claim 9 wherein receiving packets comprises receiving voice packets.

12. The method of claim 9 wherein the primary tunnel and the backup tunnel are in a MPLS network and wherein forwarding packets comprises utilizing Fast Reroute.

13. The method of claim 9 wherein applying said QoS policy to the demoted packets comprises enforcing said QoS policy such that the non-rerouted packets have priority over the demoted packets.

14. The method of claim 9 wherein marking said rerouted packets comprises marking an EXP field in one or more MPLS label stack entries of the packets.

15. The method of claim 9 wherein applying a different QoS policy comprises applying a queueless rate control technique.

16. The method of claim 15 wherein applying a different QoS policy comprises controlling how bandwidth unused by non-rerouted traffic is redistributed to demoted traffic utilizing coupled policers.

17. A non-transitory computer readable storage medium encoded with a computer-executable program for providing Quality of Service (QoS) in a network after a network failure, the computer program comprising:
code that creates a primary tunnel;
code that establishes a backup tunnel protecting a segment of said primary tunnel;
code that forwards all packets assigned to said primary tunnel via said backup tunnel in response to failure of a link or a node in said primary tunnel segment, wherein said failed link or node is no longer operable to transmit traffic in said primary tunnel segment and said failure results in a loss of connectivity over said primary tunnel segment;
code that identifies packets affected by the failure as demoted packets; and
code that applies to said demoted packets a different QoS policy than applied to packets that have not been rerouted due to the failure, wherein code that applies said different QoS policy comprises code that applies said different QoS policy until a voice load control adjusts to the failure.

18. The non-transitory computer readable storage medium of claim 17 wherein said QoS policy applied to said demoted packets is configured such that:
if there is no congestion following the failure, said demoted packets are transmitted in the same manner as the packets that have not been rerouted; and
if congestion occurs at least some of said demoted packets are dropped, while the packets that have not been rerouted are protected.

19. The non-transitory computer readable storage medium of claim 17 wherein code that applies said QoS policy to said demoted packets comprises code that enforces said QoS policy such that the non-rerouted packets have priority over the demoted packets.

20. The non-transitory computer readable storage medium of claim 17 wherein code that identifies packets affected by the failure comprises code that marks an EXP field in one or more MPLS label stack entries of the packets.

21. A system for identifying packets rerouted following a failure in a network, the system comprising:
a network element located in a path of a primary tunnel in the network and a backup tunnel protecting a segment of said primary tunnel, the network element operable to receive notification of a failure of a node or link within said primary tunnel and route all packets received from said primary tunnel to said backup tunnel, and comprising a demotion apparatus configured to mark said rerouted packets to identify packets affected by the failure as demoted packets such that a differentiated QoS policy can be applied to said demoted packets, wherein said failed link or node is no longer operable to transmit traffic in said primary tunnel segment and said failure results in a loss of connectivity over said primary tunnel segment, and wherein the demotion apparatus marks said rerouted packet following the failure and before a voice load control adjusts to the failure.

22. The system of claim 21 further comprising a bandwidth manager configured to provide call admission control of voice calls over said primary tunnels.

23. The system of claim 21 wherein the demotion apparatus is configured to mark an EXP field in one or more MPLS label stack entries of the packets.

24. Apparatus for providing Quality of Service (QoS) in a network after a network failure, the network comprising at least one primary tunnel and at least one backup tunnel protecting a segment of said primary tunnel, the apparatus comprising:
means for transmitting voice traffic received at a network device over said primary tunnel wherein voice load control is applied to said voice traffic;
means for receiving notification of a failure of a node or a link within the primary tunnel segment and routing of all traffic on the primary tunnel segment to the backup tunnel, wherein said failed link or node is no longer operable to transmit traffic in said primary tunnel segment and said failure results in a loss of connectivity over said primary tunnel segment;

means for rerouting all received packets assigned to said primary tunnel onto the backup tunnel; and means for marking rerouted packets to identify packets affected by the failure, for a time interval following the failure and before said voice load control adjusts for the failure;

wherein said rerouted packets are subject to a different QoS policy than packets that have not been rerouted due to the failure.

25. The apparatus of claim 24 wherein said QoS policy applied to said rerouted packets is configured such that:
   if there is no congestion following the failure, said rerouted packets are transmitted in the same manner as the packets that have not been rerouted; and
   if congestion occurs said rerouted packets have a lower priority than the packets that have not been rerouted.

* * * * *